Patented Dec. 6, 1938

2,138,991

UNITED STATES PATENT OFFICE 2,138,991

AZO DYESTUFFS

Carl I. Anderson, Buffalo, and Ralph B. Payne, Elma, N. Y., assignors to National Aniline & Chemical Company, Incorporated, New York, N. Y.

No Drawing. Application September 3, 1936, Serial No. 99,268

19 Claims. (Cl. 260—169)

This invention relates to new polyazo dyestuffs and to processes for making them. It relates more particularly to substantive trisazo dyestuffs which are derived from aminobenzoyl arylamines free from hydroxyl groups.

A principal object of the invention is to provide new trisazo dyestuffs which dye cotton and other cellulosic fibers brown shades fast to light and washing, and which may be used as direct dyes or as developed dyes on cellulosic fibers, but which do not dye cellulose acetate.

Another object of the invention is to provide new nitrobenzoylamino disazo and aminobenzoylamine disazo compounds and methods for their manufacture; the compounds being adapted for employment in the preparation of the new trisazo dyestuffs.

Other objects of the invention will in part be obvious and will in part appear hereinafter.

The new dyestuffs can be obtained in accordance with the present invention by converting to an aminobenzoylamino disazo compound a disazo compound formed by combining a tetrazotized aromatic diamine of the benzidine series with a hydroxyaryl carboxylic acid and with a primary arylamine which is free from a hydroxyl group and combines with a diazonium compound in the para position to the amino group, diazotizing the aminobenzoylamino disazo compound and coupling it with an azo coupling component containing a sulphonated naphthalene nucleus and a free amino group such as, for example, a naphthylamine sulfonic acid, or an amino naphthol mono- or disulfonic acid, or an aminobenzoylamino naphthol sulfonic acid.

The disazo compounds employed as intermediates in preparing the dyestuffs of the present invention may be represented by the general formula:

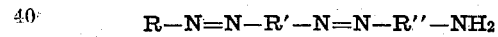

wherein R represents a hydroxyaryl carboxylic acid radical, R' represents a diphenyl radical (i. e., an unsubstituted diphenyl radical or a diphenyl radical containing substituents such as, for example, halogen, alkyl or alkoxy groups), and R'' represents an aryl radical free from a hydroxyl group to which the azo and amino groups are attached in the relatively para position.

In the preparation of the dyestuffs in accordance with a preferred method of procedure, the amino disazo compound is reacted with a meta- or para-nitrobenzoyl chloride compound (which may be unsubstituted, or may contain one or more suitable substituents such as, for example, halogen, alkyl or alkoxy groups) to replace one of the hydrogen atoms of the amino group with a meta- or para-nitrobenzoyl residue and form valuable new nitro-benzoylamino disazo compounds represented by the following general formula:

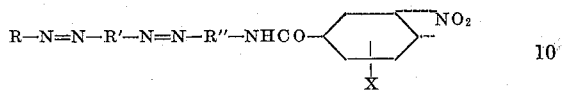

wherein R, R', and R'' have the above meaning and X denotes hydrogen, halogen, or an alkyl or alkoxy group.

The nitrobenzoylamino disazo compound thus obtained is then reduced, for example, by the action of sodium sulfide, to the corresponding aminobenzoylamino disazo compound, which forms a part of the present invention, and which is a member of the class of compounds represented by the following general formula:

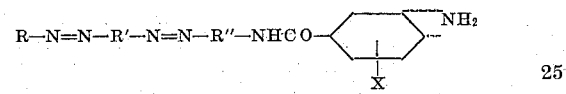

wherein R, R', and R'' and X have the above meaning. (With respect to these formulae, it will be understood that the nitro and amino groups are shown attached respectively to two carbon atoms of the benzene radical by dotted lines to indicate that the formula represents, generically, compounds in which the nitro or amino group is attached in either of these two positions. Where, in the specification and claims, this type of formula is employed, it will be understood to have this meaning.) These two formulae may be represented collectively by the following general formula:

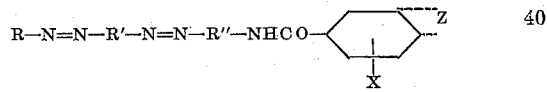

wherein R, R', R'', and X have the above meaning, and Z denotes a nitro or an amino group.

The new dyestuffs of the present invention are members of the class represented by the following general formula:

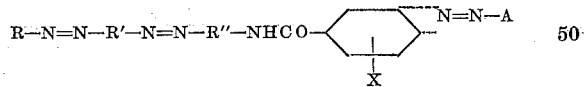

wherein R, R', R'', and X have the above meaning, and A represents the radical of an azo coupling component containing a sulphonated naphthalene nucleus and a free amino group, such as, for example, a naphthylamine sulfonic acid, an amino naphthol mono- or disulfonic acid, or an aminobenzoylaminonaphthol sulfonic acid radical. Of particular interest and importance are the compounds of this class in which R in the foregoing formula represents the radical of a hydroxyaryl carboxylic acid of the benzene or naphthalene series, especially the former series, R' represents an unsubstituted diphenyl radical, R'' represents a radical of the benzene or naphthalene series free from hydroxyl groups, especially the latter series, and A represents a 1,7- (or 1,6-) naphthylamine sulfonic acid radical.

The trisazo dyestuffs of the present invention, which are represented by the foregoing formula, and which may be prepared by the process outlined above, are characterized by their substantive dyeing qualities. They may be employed to dye unmordanted cotton brown shades which are fast to light and washing. Further, they have no affinity for organic derivatives of cellulose, and, hence, are of value in the cross-dyeing of cellulose acetate-cotton unions. Many of them may be diazotized and coupled on the fiber in the usual manner with suitable azo components, such as meta-phenylene diamine, meta-tolylene diamine, and beta-naphthol to give brown shades which have improved fastness to light and to washing.

The following specific example will further illustrate the invention, but it is to be understood that the invention is not limited thereto since it will be readily apparent that many variations may be made therein without departing from the scope of the invention. The parts are by weight:

*Example, Part A.*—18.4 parts benzidine are tetrazotized and combined in the well-known manner, first with salicylic acid, then with 1,7-Cleve's acid (1,7-naphthylamine sulfonic acid), and the resulting disazo compound (salicylic acid→benzidine→1,7-Cleve's acid) is isolated as the sodium salt. It is dissolved in about 600 parts water which contains about 6 parts of soda ash and the solution is warmed to about 80° C. 18.8 parts of para-nitrobenzoyl chloride are added to this warm alkaline solution, and the agitated mixture is maintained between 75° C. and 85° C. for about six or seven hours or until a diazotization test shows that the amino group of the disazo compound is no longer present. In this manner, the para-nitrobenzoyl chloride is made to combine with the amino group in the Cleve's acid residue of the disazo compound to form a new disazo compound which has the probable formula:

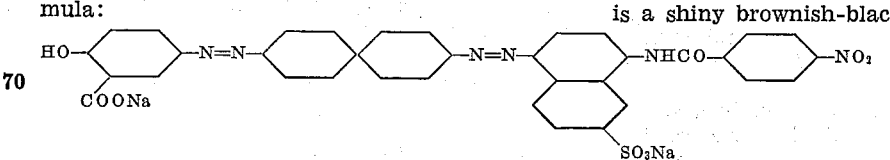

The compound, as it forms in the reaction mixture precipitates as fine dark brown to black crystals. At the end of the benzoylation period, the mixture is filtered and the new nitrobenzoylamino disazo compound remains on the filter as a cake of dark crystals. The cake is washed on the filter with 50 to 100 parts cold water to remove or displace adhering mother liquor.

*Part B.*—The washed filter cake of the nitrobenzoylated disazo compound (prepared in accordance with Part A of this example) is slurried with 675 parts of water, and to the vigorously agitated slurry, which is maintained at about 35° C., a filtered aqueous solution of 25.5 parts of fused sodium sulfide (60% Na₂S) in 150 parts of water, which is at about 50° C., is added slowly over a period of about one hour. The sulfide reduces the nitro group in the disazo compound to an amino group, and the reduction is completed by continued agitation of the mixture for about 45 minutes to one hour at about 45° C. The reduced compound is insoluble in the liquid of the reduction mixture, and is filtered therefrom when the reduction is complete. After filtration, the filter cake of the reduced compound is washed on the filter with 200 to 300 parts of a 10% aqueous solution of common salt. The reduced compound thus obtained has the probable formula:

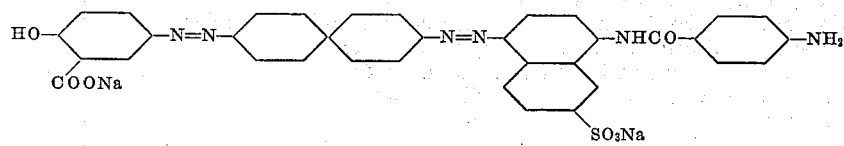

*Part C.*—The cake of the aminobenzoylamino disazo compound prepared by the procedure of Part B of this example is slurried in 1000 parts water; the resulting slurry is made very slightly alkaline with soda ash if necessary. It is then heated to near its boiling point, and after the addition thereto of 6 parts sodium nitrite, is poured slowly into a vigorously agitated mixture of 42 parts of 20° Bé. hydrochloric acid and sufficient ice to reduce the temperature of the resulting diazotized mixture to between 0° C. and 5° C. To insure complete diazotization, the mixture is agitated vigorously for two or more hours, and tested in the usual manner for sufficiency of nitrous and mineral acids. It is then poured into a mixture of 26 parts 1,7-Cleve's acid, 20 parts soda ash, 400 parts water, and sufficient ice to keep the final mixture at about 5° C. Coupling takes place readily and the finished combination as it forms comes out of solution as brown crystals. The combination is complete at the end of three or more hours. The mixture is then heated to 85° C., and filtered; the filter cake of dyestuff is washed with about 200 or 300 parts of a 10% solution of common salt and dried in the usual manner. The dyestuff as the sodium salt has the probable formula:

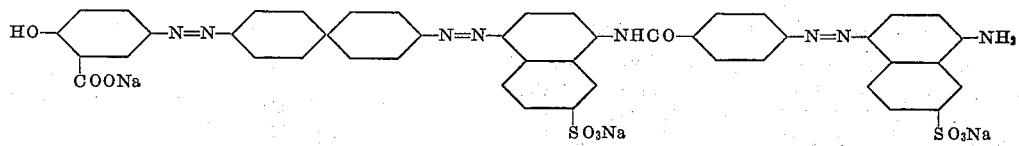

It is a dark, bronzy solid which when ground is a shiny brownish-black powder which is soluble in cold water and more readily soluble in hot water. It dissolves in concentrated sulfuric acid to form a reddish-blue solution which upon dilution with water deposits the color acid as black crystals. It dyes unmordanted cotton brown shades which are fast to washing and to light. The dyestuff can be diazotized on the fiber and developed with meta-phenylene diamine or meta-tolylene diamine or beta-naphthol to produce brown shades which are fast to washing. The dyestuff does not dye cellulose esters and ethers.

It will be understood, of course, the invention is not limited to the particular conditions outlined in the foregoing example, but that different concentrations, temperatures and orders of combination of the various components may be employed. For example, while in the foregoing description there has been illustrated a process in which the nitrobenzoylamino disazo compound is reduced by means of an aqueous solution of sodium sulfide, other reduction methods commonly used for the conversion of nitro azo compounds to the corresponding amino azo bodies may be employed with equivalent results. Thus, the reduction may be efficiently carried out with the use of an aqueous alkaline polysulfide solution in known manner.

Further, it will be understood that the invention is not limited to the particular benzoylamino disazo and trisazo compounds of the example but includes within its broad aspect other compounds which are members of the classes represented by the formulas hereinabove set forth, and which may be prepared in an analogous manner through the utilization of other intermediates. Thus, in the example in place of benzidine, there may be employed other diaryl diamines of the benzidine series such as, for example, the halogeno-, alkyl-, alkoxy-, etc. benzidines, e. g., dichlorobenzidine, tolidine, dianisidine, dipheneditin, tetramethoxy benzidine, and the like.

The other components employed in the example may likewise be of varied character. Thus, other hydroxyaryl carboxylic acids, and particularly hydroxyaryl carboxylic acids of the benzene and naphthalene series such as, for example, cresotinic acid, hydroxy naphthoic acid, and the like, may be employed in place of the salicylic acid employed as the first component; other primary arylamines capable of coupling with diazonium compounds in the para position to the amino group such as, for example, 1,6-naphthylamine sulfonic acid, alpha-naphthylamine, 3-amino-4-cresol methyl ether, orthoanisidine, xylidine, and the like, may be substituted for the 1,7-naphthylamine sulfonic acid as the second component; and in place of 1,7-naphthylamine sulfonic acid as the end component combined with the diazotized aminobenzoylamino disazo compound, there may be employed other azo coupling components containing a sulphonated naphthalene nucleus and a free amino group such as, for example, other napthylamine sulfonic acids, e. g., 1,6-naphthylamine sulfonic acid or a mixture of 1,7- and 1,6-naphthylamine sulfonic acids; amino naphthol sulfonic acids, such as, for example, 2-amino-5,7-napthol sulfonic acid, aminobenzoyl I-acid, 2-amino-8,6-naphthol sulfonic acid; and amino naphthol disulfonic acids, e. g., H-acid, SS-acid, 2R-acid, etc.

In accordance with the preferred procedure, however, 1,7- or 1,6-naphthylamine sulfonic acid or a mixture of such acids is employed as the fourth component in the preparation of the dyestuffs of the invention, since it has been found that such dyestuffs are of particular value for dyeing cotton and other cellulosic fibers brown shades. Furthermore, these dyestuffs, after application to the fiber, may be further diazotized and coupled with suitable azo components, such as meta-phenylene diamine, meta-tolylene diamine, or beta-naphthol, for the production of brown dyeings which are fast to washing and are particularly valuable for cross-dyeing. Where the amino naphthol sulfonic acids are employed as the final component in the preparation of the trisazo dyestuff of the present invention, their combination with the diazotized aminobenzoylamino disazo compound may be effected in acid or alkaline solutions. When the combination is effected in alkaline solutions, the resulting dyestuffs are, in general, capable of being developed on the fiber.

Since changes in carrying out the above process, and modifications in the products which embody the invention may be made without departing from the scope of the invention, it is intended that all matter contained in the above description shall be interpreted as illustrative, and not in a limiting sense.

We claim:

1. Trisazo dyestuffs having the following general formula:

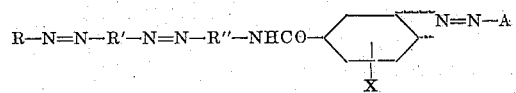

wherein R represents a hydroxyaryl carboxylic acid radical, R' represents a diphenyl radical, R'' represents an aryl radical free from a hydroxyl group, to which the azo and amino groups are attached in the relatively para position, X represents a member selected from the group consisting of hydrogen, halogen, an alkyl group, and an alkoxy group, and A represents the radical of an azo coupling component containing a sulfonated naphthalene nucleus and a free amino group.

2. Trisazo dyestuffs having in the form of the free acid the following general formula:

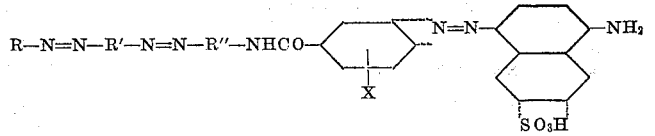

wherein R represents the radical of a hydroxyaryl carboxylic acid selected from the group consisting of the hydroxy carboxylic acids of the benzene and naphthalene series, R' represents a diphenyl radical containing its nucleus a member selected from the group consisting of hydrogen, halogen, alkyl and alkoxy radicals, R'' represents an aryl radical selected from the radicals of the benzene and naphthalene series free from a hydroxyl group, to which azo and amino groups are attached in the relatively para position, and X represents a member selected from the group consisting of hydrogen, halogen, an alkyl radical, and an alkoxy radical.

3. Trisazo dyestuffs having in the form of the free acid the following general formula:

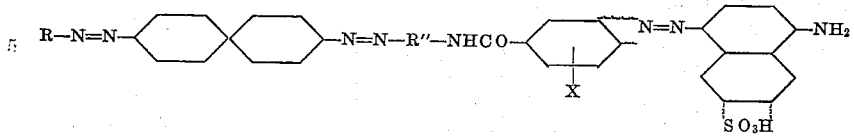

wherein R represents the radical of a hydroxyaryl carboxylic acid of the benzene series, R" represents a radical of the naphthalene series free from a hydroxyl group, to which the azo and amino groups are attached in the relatively para position, and X represents a member selected from the group consisting of hydrogen, halogen, an alkyl radical, and an alkoxy radical.

4. The trisazo dyestuff having in the form of the sodium salt the following formula:

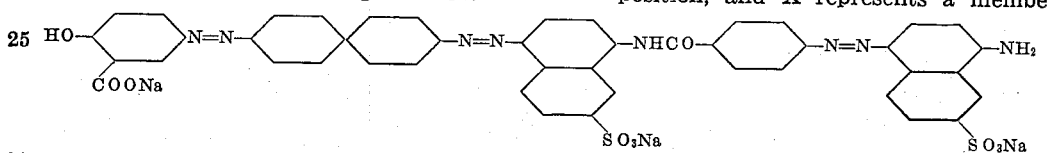

said dyestuff being a dark bronzy solid which when ground is a shiny brownish-black powder soluble in cold or hot water and dissolving in concentrated sulfuric acid to form a reddish-blue solution which upon dilution with water deposits the free color acid as black crystals; said dyestuff dyeing unmordanted cotton brown shades which are fast to light and washing, and being capable of being further developed on the fiber.

5. Aminobenzoylamino disazo compounds having the following general formula:

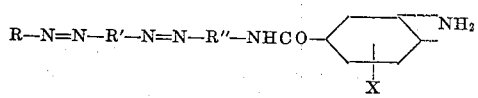

wherein R represents a hydroxyaryl carboxylic acid radical, R' represents a diphenyl radical, R" represents an aryl radical free from a hydroxyl group, to which the azo and amino groups are attached in the relatively paraposition, and X represents a member selected from the group consisting of hydrogen, halogen, an alkyl radical, and an alkoxy radical.

6. Aminobenzoylamino disazo compounds having the following general formula:

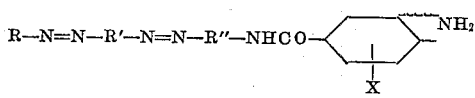

wherein R represents the radical of a hydroxylaryl carboxylic acid selected from the group consisting of the hydroxy carboxylic acids of the benzene and naphthalene series, R' represents a diphenyl radical containing in its nucleus a member selected from the group consisting of hydrogen, halogen, alkyl, and alkoxy radicals, R" represents an aryl radical selected from the radicals of the benzene and naphthalene series free from a hydroxyl group, to which the azo and amino groups are attached in the relatively para position, and X represents a member selected from the group consisting of hydrogen, halogen, an alkyl radical, and an alkoxy radical.

7. Aminobenzoylamino disazo compounds having the following general formula:

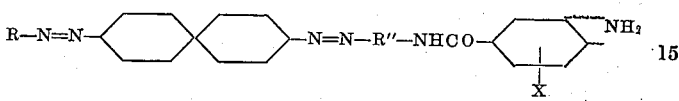

wherein R represents the radical of a hydroxyaryl carboxylic acid of the benzene series, R" represents a radical of the naphthalene series free from a hydroxyl group, to which the azo and amino groups are attached in the relative para position, and X represents a member selected from the group consisting of hydrogen, halogen, an alkyl radical, and an alkoxy radical.

8. Nitrobenzoylamino disazo compounds having the following general formula:

R—N=N—R'—N=N—R"—NHCO—⟨ring⟩-NO₂, X wherein R represents a hydroxyaryl carboxylic acid radical, R' represents a diphenyl radical, R" represents an aryl radical free from a hydroxyl group, to which the azo and amino groups are attached in the relatively para position, and X represents a member selected from the group consisting of hydrogen, halogen, an alkyl radical, and an alkoxy radical.

9. Nitrobenzolamino disazo compounds having the following general formula:

R—N=N—R'—N=N—R"—NHCO—⟨ring⟩-NO₂, X wherein R represents the radical of a hydroxyaryl carboxylic acid selected from the group consisting of the hydroxy carboxylic acids of the benzene and naphthalene series, R' represents a diphenyl radical containing in its nucleus a member selected from the group consisting of hydrogen, halogen, alkyl and alkoxy radicals, R" represents an aryl radical selected from the radicals of the benzene and naphthalene series free from a hydroxyl group, to which the azo and amino groups are attached in the relatively para position, and X represents a member selected from the group consisting of hydrogen, halogen, an alkyl radical, and an alkoxy radical.

10. Nitrobenzoylamino disazo compounds having the following general formula:

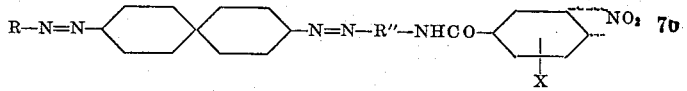

wherein R represents the radical of a hydroxyaryl carboxylic acid of the benzene series, R"

represents a radical of the naphthalene series free from a hydroxyl group, to which the azo and amino groups are attached in the relatively para position, and X represents a member selected from the group consisting of hydrogen, halogen, an alkyl group, and an alkoxy group.

11. The process for the preparation of trisazo dyestuffs which comprises converting an amino disazo compound obtainable by tetrazotizing a diaryl diamine of the benzidine series and coupling the tetrazotized product with a hydroxyaryl carboxylic acid and with a primary arylamine free from a hydroxyl group, and capable of coupling with diazonium compounds in the para position to the amino group, to the corresponding aminobenzoylamino disazo compound, diazotizing the said aminobenzoylamino disazo compound, and coupling the diazotized product with an azo coupling component containing a sulphonated naphthalene nucleus and a free amino group.

12. The process for the preparation of trisazo dyestuffs which comprises reacting an amino disazo compound obtainable by tetrazotizing a diaryl diamine selected from the group consisting of benzidine and diaryl diamines of the benzidine series containing substituents selected from the group consisting of halogen, alkyl and alkoxy radicals and coupling the tetrazotized product with a hydroxyaryl carboxylic acid selected from the group consisting of the hydroxy carboxylic acids of the benzene and naphthalene series and with a primary arylamine selected from the group consisting of the primary arylamines of the benzene and the naphthalene series free from hydroxyl groups and capable of coupling with diazonium compounds in the para position to the amino group with a compound selected from the group consisting of the meta- and para-nitrobenzoyl chlorides to form a nitrobenzoylamino disazo compound, reducing the said nitrobenzoylamino disazo compound to the corresponding aminobenzoylamino disazo compound, diazotizing the aminobenzoylamino disazo compound, and coupling the diazotized product with a naphthylamine sulfonic acid.

13. The process for the preparation of a trisazo dyestuff which comprises tetrazotizing benzidine and coupling the tetrazotized product first with salicyclic acid and then with 1,7-naphthylamine sulfonic acid to prepare an amino disazo compound, preparing a nitrobenzoylamino disazo compound by reacting said amino disazo compound with para-nitrobenzoyl chloride, reducing the said nitrobenzoylamino disazo compound to the corresponding aminobenzoylamino disazo compound, diazotizing the said aminobenzoylamino disazo compound, and coupling the diazotized product with 1,7-naphthylamine sulfonic acid.

14. The process for the preparation of nitrobenzoylamino disazo compounds valuable for use in the preparation of polyazo dyestuffs which comprises reacting an amino disazo compound obtainable by tetrazotizing a diaryl diamine of the benzidine series and coupling the tetrazotized product with a hydroxyaryl carboxylic acid selected from the group consisting of the hydroxy carboxylic acids of the benzene and naphthalene series and with a primary arylamine free from a hydroxyl group and capable of coupling with diazonium compounds in the para position to the amino group, with a compound selected from the group consisting of meta- and para-nitrobenzoyl chlorides.

15. The process for the preparation of nitrobenzoylamino disazo compounds valuable for use in the preparation of polyazo dyestuffs which comprises reacting a compound selected from the group consisting of meta- and para-nitrobenzoyl chlorides with an amino disazo compound obtainable by tetrazotizing a diaryl diamine selected from the group consisting of benzidine and diaryl diamines of the benzidine series containing substituents selected from the group consisting of halogen, alkyl and alkoxy radicals, coupling the tetrazotized product with a hydroxyaryl carboxylic acid selected from the group consisting of the hydroxy carboxylic acids of the benzene and naphthalene series and with a primary arylamine selected from the group consisting of the primary arylamines of the benzene and the naphthalene series free from hydroxyl groups and capable of coupling with diazonium compounds in the para position to the amino group.

16. The process for the preparation of aminobenzoylamino disazo compounds valuable for use in the preparation of polyazo dyestuffs which comprises reacting an amino disazo compound obtainable by tetrazotizing a diaryl diamine of the benzidine series and coupling the tetrazotized product with a hydroxyaryl carboxylic acid and with a primary arylamine free from a hydroxyl group and capable of coupling with diazonium compounds in the para position to the amino group, with a compound selected from the group consisting of meta- and para-nitrobenzoyl chlorides whereby a nitrobenzoylamino disazo compound is produced, and reducing the said nitrobenzoylamino disazo compound to the corresponding aminobenzoylamino disazo compound.

17. The process for the preparation of aminobenzoylamino disazo compounds valuable for use in the preparation of polyazo dyestuffs which comprises reacting an amino disazo compound obtainable by tetrazotizing a diaryl diamine selected from the group consisting of benzidine and diaryl diamines of the benzidine series containing substituents selected from the group consisting of halogen, alkyl and alkoxy radicals and coupling the tetrazotized product with a hydroxyaryl carboxylic acid selected from the group consisting of the hydroxy carboxylic acids of the benzene and naphthalene series and with a primary arylamine selected from the group consisting of the primary arylamines of the benzene and the naphthalene series free from hydroxyl groups and capable of coupling with diazonium compounds in the para position to the amino group, with a compound selected from the group consisting of meta- and para-nitrobenzoyl chlorides whereby a nitrobenzoylamino disazo compound is produced, and reducing the said nitrobenzoylamino disazo compound to the corresponding aminobenzoylamino disazo compound.

18. Compounds having the following general formula:

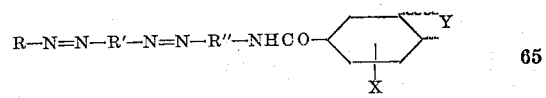

wherein R represents a hydroxyaryl carboxylic acid radical, R' represents a diphenyl radical, R'' represents an aryl radical free from a hydroxyl group, to which the azo and amino groups are attached in the relatively para position, X represents a member selected from the group consisting of hydrogen, halogen, an alkyl radical, and an alkoxy radical, and Y represents a member selected from the group consisting of a nitro group, an amino group, and a diazotized amino group having attached thereto the radical of an azo coupling component containing a sulfonated naphthalene nucleus and a free amino group.

19. In a process for the preparation of polyazo compounds the improvement which comprises reacting an amino disazo compound obtainable by tetrazotizing a diaryl diamine of the benzidine series and coupling the tetrazotized product with a hydroxyaryl carboxylic acid and with a primary arylamine free from a hydroxyl group and capable of coupling with diazonium compounds in the para position to the amino group, with a compound selected from the group consisting of meta- and para-nitrobenzoyl chlorides.

CARL I. ANDERSON.
RALPH B. PAYNE.